United States Patent Office 3,786,063
Patented Jan. 15, 1974

3,786,063
THIAZOLETHIOSULFONATES
Robert J. Arnold, Chicago, Ill., assignor to Universal Oil Products Company, Des Plaines, Ill.
No Drawing. Filed May 24, 1971, Ser. No. 146,481
Int. Cl. C07d 91/44
U.S. Cl. 260—306.5     5 Claims

ABSTRACT OF THE DISCLOSURE

Novel compound of the formula

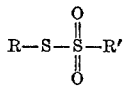

where at least one of R and R′ is thiazole. The compound is used as a vulcanization accelerator in vulcanizable diene rubber formulations.

DESCRIPTION OF THE INVENTION

In one embodiment the present invention relates to a novel composition of matter having the formula set forth above.

In another embodiment the novel compound of the present invention is used as a vulcanization accelerator in a vulcanizable diene rubber formulation.

Where R or R′ in the above formula is thiazole, the other R or R′ preferably is selected from aryl, particularly phenyl, alkyl of 1 to 20 carbon atoms and cycloalkyl containing from 3 to 12 carbon atoms in the ring, and substituted derivatives of these.

Referring to the above formula, where R is the thiazole moiety, illustrative compounds comprise thiazolyl arenethiolsulfonates, thiazolyl alkanethiolsulfonates, thiazolyl cycloalkanethiolsulfonates, etc. Where R′ in the above formula is the thiazole moiety, illustrative compounds comprise aryl thiazolethiolsulfonates, alkyl thiazolethiolsulfonates, cycloalky thiazolethiolsulfonates, etc.

In a preferred embodiment the thiazole moiety is benzothiazole and substituted derivatives thereof including, for example, 4-phenylbenzothiazole, methylbenzothiazole, etc. In another embodiment the thiazole moiety may comprise 4,5-dimethylthiazole, 4-ethylthiazole, 4-phenylthiazole, naphthothiazole, etc.

Preferred compounds comprise those in which R in the above formula is benzothiazole and R′ is aryl and particularly phenyl or substituted derivatives thereof. In a preferred embodiment the substituent is selected from alkyl of 1 to 20 and preferably 1 to 6 carbon atoms in either straight chain or branched chain arrangement and of primary, secondary or tertiary configuration. In another prefered embodiment, the substituent comprises NO₂. Other substituents comprise halogen, including chlorine, bromine, iodine and fluorine, with chlorine and bromine being preferred, SR″, SH, OH and OR″ where R″ is alkyl of 1 to 6 carbon atoms. The substitution may be in the o, m or p positions on the phenyl ring and, when two substitutions are attached to a phenyl ring, these may be in the 2,3-, 2,4-, 2,5-, 2,6-, 3,4- or 3,5-positions. Another embodiment comprises the corresponding naphthyl derivatives.

Illustrative compounds in which R is benzothiazole and R′ is phenyl or substituted derivatives thereof include benzothiazolyl benzenethiolsulfonate,
benzothiazolyl toluenethiolsulfonate,
benzothiazolyl xylenethiolsulfonate,
benzothiazolyl ethylbenzenethiolsulfonate,
benzothiazolyl diethylbenzenethiolsulfonate,
benzothiazolyl propylbenzenethiolsulfonate,
benzothiazolyl butylbenzenethiolsulfonate,
benzothiazolyl dibutylbenzenethiolsulfonate,
benzothiazolyl pentylbenzenethiolsulfonate,
benzothiazolyl dipentylbenzenethiolsulfonate,
benzothiazolyl hexylbenzenethiolsulfonate,
benzothiazolyl dihexylbenzenethiolsulfonate,
benzothiazolyl methylethylbenzenethiolsulfonate,
benzothiazolyl methylpropylbenzenethiolsulfonate,
benzothiazolyl methylbutylbenzenethiolsulfonate,
benzothiazolyl ethylpropylbenzenethiolsulfonate,
benzothiazolyl ethylbutylbenzenethiolsulfonate,
benzothiazolyl nitrobenzenethiolsulfonate,
benzothiazolyl dinitrobenzenethiolsulfonate, etc., and corresponding naphthyl derivatives.
Other illustrative compounds include benzothiazolyl methanethiolsulfonate,
benzothiazolyl ethanethiolsulfonate,
benzothiazolyl propanethiolsulfonate,
benzothiazolyl butanethiolsulfonate,
benzothiazolyl pentanethiolsulfonate,
benzothiazolyl hexanethiolsulfonate,
benzothiazolyl heptanethiolsulfonate,
benzothiazolyl octanethiolsulfonate,
benzothiazolyl nonanethiolsulfonate,
benzothiazolyl decanethiolsulfonate, etc.;
benzothiazolyl cyclopropanethiolsulfonate,
benzothiazolyl cyclobutanethiolsulfonate,
benzothiazolyl cyclopentanethiolsulfonate,
benzothiazolyl cyclohexanethiolsulfonate,
benzothiazolyl cycloheptanethiolsulfonate,
benzothiazolyl cyclooctanethiolsulfonate, etc.

In another embodiment, illustrative compounds comprise phenyl benzothiazolethiolsulfonate, tolyl benzothiazolethiolsulfonate,
xylyl benzothiazolethiolsulfonate,
ethylphenyl benzothiazothiolsulfonate,
propylphenyl benzothiazolethiolsulfonate,
propylphenyl benzothiazolethiolsulfonate,
butylphenyl benzothiazolethiolsulfonate,
pentylphenyl benzothiazolethiolsulfonate,
hexylphenyl benzothiazolethiolsulfonate,
diethylphenyl benzothiazolethiolsulfonate,
dipropylphenyl benzothiazolethiolsulfonate,
dibutyl phenyl benzothiazolethiolsulfonate,
methylethylphenyl benzothiazolethiolsulfonate,
methylpropylphenyl benzothiazolethiolsulfonate,
methylbutylphenyl benzothiazolethiolsulfonate,
ethylpropylphenyl benzothiazolethiolsulfonate,
ethylbutylphenyl benzothiazolethiolsulfonate,
propylbutylphenyl benzothiazolethiolsulfonate,
nitrophenyl benzothiazolethiolsulfonate,
dinitrophenyl benzothiazolethiolsulfonate, etc.;
methyl benzothiazolethiolsulfonate,
ethyl benzothiazolethiolsulfonate,
propyl benzothiazolethiolsulfonate,
butyl benzothiazolethiolsulfonate, pentyl benzothiazolethiolsulfonate,
hexyl benzothiazolethiolsulfonate,
heptyl benzothiazolethiolsulfonate,
octyl benzothiazolethiolsulfonate,
nonyl benzothiazolethiolsulfonate,
decyl benzothiazolethiolsulfonate,
undecyl benzothiazolethiolsulfonate,
dodecyl benzothiazolethiolsulfonate,
cyclopentyl benzothiazolethiolsulfonate,
cyclohexyl benzothiazolethiolsulfonate,
cycloheptyl benzothiazolethiolsulfonate,
cyclooctyl benzothiazolethiolsulfonate, etc.

While the benzothiazole derivatives are preferred, other thiazole derivatives are comprised in the present invention. Illustrative examples of these compounds include 4,5-dimethylthiazolyl arenethiolsulfonates,
4,5-dimethylthiazolyl alkanethiolsulfonates,
4,5-dimethylthiazolyl cycloalkanethiolsulfonates;
4-ethylthiazolyl arenethiolsulfonates,
4-ethylthiazolyl alkanethiolsulfonates,
4-ethylthiazolyl cycloalkanethiolsulfonates;
4-phenylthiazolyl arenethiolsulfonates,
4-phenylthiazolyl alkanethiolsulfonates,
4-phenylthiazolyl cycloalkanethiolsulfonates;
naphthothiazolyl arenethiolsulfonates,
naphthothiazolyl alkanethiolsulfonates,
naphthothiazolyl cycloalkanethiolsulfonates, etc.;
aryl 4,5-dimethylthiazolethiolsulfonates,
alkyl 4,5-dimethylthiazolethiolsulfonates,
cycloalkyl 4,5-dimethylthiazolethiolsulfonates;
aryl 4-ethylthiazolethiolsulfonates,
alkyl 4-ethylthiazolethiolsulfonates,
cycloalkyl 4-ethylthiazolethiolsulfonates;
aryl 4-phenylthiazolethiolsulfonates,
alkyl 4-phenyl thiazolethiolsulfonates,
cycloalkyl 4-phenylthiazolethiolsulfonates;
aryl naphthothiazoethiolsulfonates,
alkyl naphthothiazolethiolsulfonates,
cycloalkyl naphthothiazolethiolsulfonates, etc.

It is understood that the arene, alkane, cycloalkane, aryl, alkyl and cycloalkyl moiety will be selected from those hereinbefore set forth.

The compounds of the present invention may be prepared in any suitable manner. In one method, they are prepared by the addition of a previously prepared solution of an appropriate sulfenyl chloride in a suitable organic solvent to a cooled, well stirred slurry of the alkali metal salt of an appropriate sulfinic acid in the same or different organic solvent. As will be described in detail in an example appended hereto, benzothiazolyl p-toluenethiolsulfonate was prepared by the addition of benzothiazole sulfenyl chloride to the sodium salt of p-toluene sulfinic acid. Other methods of preparation may be selected from (1) direct peracid oxidation of an appropriate disulfide, (2) chlorinolysis of an appropriate disulfide in the presence of an organic acid, followed by the addition of water, etc.

The novel compounds of the present invention are particularly suitable for use as vulcanization accelerators in vulcanizable diene rubber formulations. As an aid in the manufacture of rubber products, it is desired in many cases to accelerate the vulcanization reaction, and this is accomplished by incorporating a vulcanization accelerator in the rubber formulation. In one embodiment the compound of the present invention is used for this purpose and, in this embodiment, it generally will be used in a concentration of about 1 to about 2 parts by weight per 100 parts of rubber hydrocarbon, although larger or smaller concentrations may be used when desired. In another embodiment the compound of the present invention may be used in conjunction with one or more conventional vulcanization accelerators. The conventional accelerators include aromatic thiazole accelerators, such as 2-mercaptobenzothiazole, N - cyclohexyl-2-benzothiazole sulfenamide, N-tert-butyl-2-benzothiazole sulfenamide, 2-(morpholinothio)-benzothiazole, 2-benzothiazolyl diethyldithiocarbamate, etc., amine salts of mercaptobenzothiazole accelerators, etc. Other accelerators include thiuram disulfides, thiocarbamylsulfenamides, thioureas, xanthates, guanidine derivatives, etc. The vulcanizing accelerator will be used in conventional concentrations in the rubber formulation and generally will be within the range of from about 1 to about 1.5 parts by weight per 100 parts of rubber hydrocarbon in the formulation. It is understood that smaller or larger concentrations may be used when desired.

It is understood that the rubber formulation also may include an antiozonant in order to protect the rubber product against cracking due to ozone. Any suitable antiozonant is used in the rubber formulation and, in one embodiment, is of the phenylenediamine type and includes, for example, N,N'-di-sec-alkyl-p-phenylenediamine in which the alkyl contains from 3 to 12 carbon atoms, N-phenyl-N'-sec-alkyl - p - phenylenediamine in which the alkyl contains from 3 to 12 carbon atoms, N,N'-dicyclohexyl - p - phenylenediamine, - N-phenyl-N'-cyclohexyl-p-phenylenediamine, etc. In another embodiment the antiozonant is of the aminophenol type and includes $N$-$C_3$-$C_{20}$-alkyl-p-aminophenol, N-cycloalkyl-p-aminophenol in which the cycloalkyl ring contains from 3 to 12 carbon atoms, etc. The antiozonant may be used in a concentration of from 1 to about 5 parts by weight per 100 parts of rubber hydrocarbon in the formulation.

The different thiolsulfonates of the present invention may function differently in rubber formulations of different compositions. Accordingly, the thiolsulfonate will be selected to satisfy the particular requirements of the particular processing method employed in the manufacturing plant. The rubber formulation also generally will include carbon, zinc oxide, sulfur, stearic acid, antioxidant, etc., all of these being used in conventional concentrations. The vulcanization is effected in conventional manner.

The thiolsulfonates of the present invention also may have utility as bactericides, fungicides, algaecides, etc. Here again, the thiolsulfonate may be used in conjunction with other compounds.

The following examples are introduced to illustrate further the novelty and utility of the present invention but not with the intention of unduly limiting the same.

EXAMPLE I

This example describes the preparation of benzothiazolyl p-toluenethiolsulfonate. It will be noted that for this compound, R in the formula hereinbefore set forth is benzothiazole derivative and R' is p-toluene derivative.

In this preparation, 7.1 g. (0.1 mole) of chlorine, which previously had been condensed for weighing, was added at —5 to —10° C. with stirring to a slurry of 33.2 g. (0.1 mole) of benzothiazolyl disulfide in about 100 ml. of methylene dichloride.

The resulting dark brownish mixture was filtered and added dropwise to a stirred slurry of 0.2 mole of the sodium salt of p-toluene sulfinic acid at 0–5° C. The resulting slurry was stirred at room temperature for an additional hour and then washed with water and saturated $NaHCO_3$, dried and the solvent removed to give a light yellow solid. This was recrystallized from a methanol: benzene solvent to yield 40.2 g. (71.2% yield) of light yellow crystals, M.P. 141–142.5° C. The structure of the product was confirmed by NMR and IR analysis. Elemental analysis showed 29.7% sulfur, 52.48% carbon, 3.51% hydrogen and 4.32% nitrogen, which correlate with the theoretical amounts of 29.9% sulfur, 52.3% carbon, 3.43% hydrogen and 4.37% nitrogen.

The above preparation may be illustrated by the following equations.

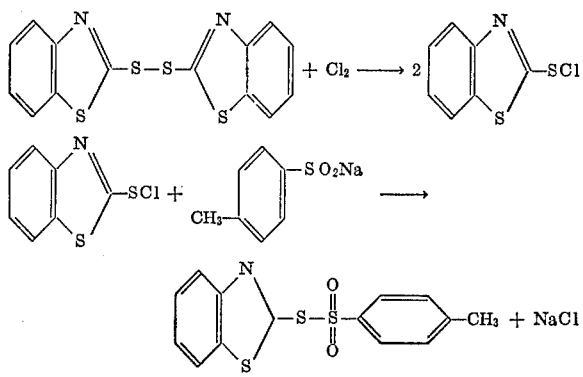

EXAMPLE II

Benzothiazolyl benzenethiolsulfonate is prepared in substantially the same manner as described in Example I except that the sodium salt of benzene sulfinic acid is used in place of the corresponding toluene salt.

EXAMPLE III

Benzothiazolyl decanethiolsulfonate is prepared in substantially the same manner except that the potassium salt of decane sulfinic acid is used as a reactant.

EXAMPLE IV

Benzothiazolyl cyclohexanethiolsulfonate is prepared in substantially the same manner as hereinbefore described, except that the sodium salt of cyclohexane sulfinic acid is used as a reactant.

EXAMPLE V

Phenyl benzothiazolethiolsulfonate is prepared by the reaction of benzenesulfenyl chloride with the sodium salt of benzothiazole sulfinic acid.

EXAMPLE VI

Additional thiolsulfonates are prepared in substantially the same manner as described above by using the appropriate sulfenyl chloride and an alkali metal salt of the appropriate sulfinic acid. Illustrative compounds include:

benzothiazolyl o-nitrobenzenethiolsulfonate
benzothiazolyl m-nitrobenzenethiolsulfonate
benzothiazolyl 2,4-dinitrobenzenethiolsulfonate
benzothiazolyl octanethiolsulfonate.

EXAMPLE VII

Still other compounds which are prepared in accordance with the present invention include the following:

tolyl benzothiazolethiolsulfonate
xylyl benzothiazolethiolsulfonate
o-nitrophenyl benzothiazolethiolsulfonate
m-nitrophenyl benzothiazolethiolsulfonate
octyl benzothiazolethiolsulfonate
nonyl benzothiazolethiolsulfonate
decyl benzothiazolethiolsulfonate
cyclohexyl benzothiazolethiolsulfonate.

EXAMPLE VIII

Additional illustrative thiolsulfonates which may be prepared in accordance with the present invention include 4,5-dimethylthiazolyl benzenethiolsulfonate,
4,5-dimethylthiazolyl toluenethiolsulfonate,
4,5-dimethylthiazolyl xylenethiolsulfonate,
4,5-dimethylthiazolyl nitrobenzenethiolsulfonate,
4,5-dimethylthiazolyl dinitrobenzenethiolsulfonate,
4,5-dimethylthiazolyl decanethiolsulfonate,
4,5-dimethylthiazolyl cyclohexanethiolsulfonate,
4-ethylthiazolyl benzenethiolsulfonate,
4-ethylthiazolyl toluenethiolsulfonate,
4-ethylthiazolyl xylenethiolsulfonate,
4-ethylthiazolyl nitrobenzenethiolsulfonate,
4-ethylthiazolyl dinitrobenzenethiolsulfonate,
4-ethylthiazolyl decanethiolsulfonate,
4-ethylthiazolyl cyclohexanethiolsulfonate;
4-phenylthiazolyl benzenethiolsulfonate,
4-phenylthiazolyl toluenethiolsulfonate,
4-phenylthiazolyl xylenethiolsulfonate,
4-phenylthiazolyl nitrobenzenethiolsulfonate,
4-phenylthiazolyl dinitrobenzenethiolsulfonate,
4-phenylthiazolyl decanethiolsulfonate,
4-phenylthiazolyl cyclohexanethiolsulfonate;
naphthothiazole benzenethiolsulfonate,
naphthothiazole toluenethiolsulfonate,
naphthothiazole xylenethiolsulfonate,
naphthothiazole nitrobenzenethiolsulfonate,
naphthothiazole dinitrobenzenethiolsulfonate,
naphthothiazole decanethiolsulfonate,
naphthothiazole cyclohexanethiolsulfonate;
phenyl 4,5-dimethylthiazolethiolsulfonate,
tolyl 4,5-dimethylthiazolethiolsulfonate,
nitrophenyl 4,5-dimethylthiazolethiolsulfonate,
dinitrophenyl 4,5-dimethylthiazolethiolsulfonate,
octyl 4,5-dimethylthiazolethiolsulfonate,
cyclohexyl 4,5-dimethylthiazolethiolsulfonate;
phenyl 4-ethylthiazolethiolsulfonate,
tolyl 4-ethylthiazolethiolsulfonate,
nitrophenyl 4-ethylthiazolethiolsulfonate,
dinitrophenyl 4-ethylthiazolethiolsulfonate,
octyl 4-ethylthiazolethiolsulfonate,
cyclohexyl 4-ethylthiazolethiolsulfonate;
phenyl naphthothiazolethiolsulfonate,
tolyl naphthothiazolethiolsulfonate,
nitrophenyl naphthothiazolethiolsulfonate,
dinitrophenyl naphthothiazolethiolsulfonate,
octyl naphthothiazolethiolsulfonate,
and cyclohexyl naphthothiazolethiolsulfonate.

EXAMPLE IX

As hereinbefore set forth, the compound of the present invention is used as a vulcanization accelerator in rubber formulations. The rubber formulation of this example was of the following recipe.

TABLE 1

| Ingredient: | Parts by weight |
|---|---|
| SBR 1502 | 100.00 |
| Furnace black | 40.00 |
| Zinc oxide | 3.00 |
| Stearic acid | 2.00 |
| Sulfur | 2.00 |
| Antiozonant [1] | 2.00 |
| Thiolsulfonate | 1.25 |

[1] N,N'-di-2-octyl-p-phenylenediamine.

The thiolsulfonate used in this example was benzothiazolyl p-toluenethiolsulfonate, prepared as described in Example I.

For comparison purposes, the data in the following table includes, as the blank run, the results obtained with the same recipe as set forth above, except that the formulation did not contain the thiolsulfonates but contained 1.25 parts by weight of N-tert-butyl-benzothiazole-2-sulfenamide. This is necessary in order that the rubber formulation will undergo vulcanization.

These results are as follows:

TABLE 2

| Run No. | Thiolsulfonate | Mooney scorch 5 pt. | Mooney scorch 20 pt. | Percent decrease in 5 pt. rise as compared to blank |
|---|---|---|---|---|
| 1 | None | 19.4 | 21.4 | |
| 2 | Benzothiazolyl p-tholenethiosulfonate | 11.1 | 15.1 | 41.4 |

From the data in the above table, it will be noted that the thiolsulfonate was effective as a vulcanization accelerator.

EXAMPLE X

As hereinbefore set forth, the thiolsulfonate of the present invention may be used along with conventional vulcanization accelerators. Such use is demonstrated in the present example in which the rubber recipe was the same as set forth in Example IX, except that it also contained 1.25 parts by weight of N-tert-butyl-benzothiazole-2-sulfenamide. Accordingly, both the benzothiazolyl p-toluenethiolsulfonate and the N-tert-butyl-benzothiazole-2-sulfenamide each were used in a concentration of 1.25 parts by weight, for a total of 2.50 parts by weight.

The results of this run were shown in the following table:

TABLE 3

| Run No. | Thiolsulfonate | Mooney scorch 5 pt. | Mooney scorch 20 pt. | Percent decrease in 5 pt. rise as compared to blank |
|---|---|---|---|---|
| 1 | None | 19.4 | 21.4 | |
| 3 | Benzothiazolyl p-toluenethialsulfonate | 17.5 | 20.3 | 17.5 |

From the data in the above table, it will be noted that the thiolsulfonate served to further accelerate vulcanization of the rubber formulation.

EXAMPLE XI

Natural rubber is compounded in conventional manner to contain 3 phr. of N-phenyl-N'-(1,3-dimethylbutyl)-p-phenylenediamine antiozonant and 1.25 phr. of benzothiazolyl benzenethiolsulfonate, prepared as described in Example II. Acceleration of vulcanization is obtained and the rubber product is protected against ozone cracking.

EXAMPLE XII

Benzothiazolyl decanethiolsulfonate, prepared as described in Example III, is incorporated in a concentration of 1.50 phr. in a cis-4-polybutadiene formulation containing 3 phr. of N,N'-di-(1,3-dimethylbutyl)-p-phenylenediamine antiozonant. The combination of additives serves to accelerate vulcanization and to protect the rubber product against ozone cracking.

EXAMPLE XIII

Cyclohexyl benzothiazolethiolsulfonate is incorporated in a concentration of 1 phr. in a conventional ethylene-propylene-terpolymer. Here again, acceleration of vulcanization is obtained.

I claim as my invention:

1. A compound of the formulae

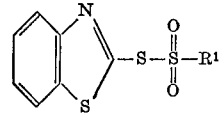

or

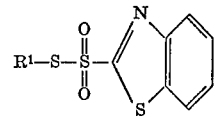

wherein $R^1$ is selected from the group consisting of $C_1$–$C_{20}$ alkyl, $C_3$–$C_{12}$ cycloalkyl, phenyl, and mono- or disubstituted phenyl, said substituents selected from the group consisting of $C_1$–$C_6$ alkyl, $NO_2$, halo, SH, OH, SR'', and OR'', where R'' is $C_1$–$C_6$ alkyl.

2. The thiolsulfonate of claim 1 being 2-benzothiazolyl benzenethiolsulfonate.

3. The thiolsulfonate of claim 1 being 2-benzothiazolyl toluenethiolsulfonate.

4. The thiolsulfonate of claim 1 being 2-benzothiazolyl $C_1$–$C_{20}$-alkanethiolsulfonate.

5. The thiolsulfonate of claim 1 being 2-benzothiazolyl cyclohexanethiolsulfonate.

References Cited

UNITED STATES PATENTS 1,544,687 7/1925 Sebrell et al. _____ 260—306.5

RICHARD J. GALLAGHER, Primary Examiner

U.S. Cl. X.R.

260—78.5, 79.5, 302 S